United States Patent
Miyagawa

(10) Patent No.: US 11,535,278 B2
(45) Date of Patent: Dec. 27, 2022

(54) CONTROL METHOD AND CONTROL DEVICE FOR AUTONOMOUS VEHICLE

(71) Applicant: NISSAN MOTOR CO., LTD., Yokohama (JP)

(72) Inventor: Tomohiro Miyagawa, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 206 days.

(21) Appl. No.: 16/652,730

(22) PCT Filed: Oct. 12, 2017

(86) PCT No.: PCT/JP2017/037079
§ 371 (c)(1),
(2) Date: Apr. 1, 2020

(87) PCT Pub. No.: WO2019/073583
PCT Pub. Date: Apr. 18, 2019

(65) Prior Publication Data
US 2020/0298890 A1 Sep. 24, 2020

(51) Int. Cl.
*B60W 60/00* (2020.01)
*G06V 20/56* (2022.01)

(52) U.S. Cl.
CPC ....... *B60W 60/00272* (2020.02); *G06V 20/56* (2022.01); *B60W 2520/10* (2013.01);
(Continued)

(58) Field of Classification Search
CPC ... B60W 60/00272; B60W 2554/4042; B60W 2554/4049; B60W 2520/10; G06K 9/00791
See application file for complete search history.

(56) References Cited

U.S. PATENT DOCUMENTS

2003/0087724 A1 5/2003 Seibertz et al.
2005/0227500 A1* 10/2005 Sugawara ......... H01J 37/32192
438/785
(Continued)

FOREIGN PATENT DOCUMENTS

DE 10 2008 006 028 A1 7/2009
JP 4-257739 A 9/1992
(Continued)

OTHER PUBLICATIONS

USPTO Office Action, U.S. Appl. No. 16/755,928, dated Dec. 30, 2021, 35 pages.
(Continued)

*Primary Examiner* — Peter D Nolan
*Assistant Examiner* — Mikko Okechukwu Obioha
(74) *Attorney, Agent, or Firm* — Foley & Lardner LLP

(57) ABSTRACT

A control method for an autonomous vehicle is used in an autonomous vehicle including an engine, and a controller that controls an operation of the engine. In the control method, required driving force is set in accordance with an intervehicular distance between an own vehicle and a preceding vehicle when there is the preceding vehicle in front of the own vehicle. Also, when there is the preceding vehicle, a behavior of the preceding vehicle is predicted from a situation in front of the preceding vehicle. Further, when there is the preceding vehicle, sailing stop is executed based on the required driving force and the predicted behavior of the preceding vehicle. The sailing stop causes the engine to stop automatically while the own vehicle is traveling at vehicle speed equal to or higher than given vehicle speed.

6 Claims, 8 Drawing Sheets

(52) U.S. Cl.
CPC .............. *B60W 2554/4042* (2020.02); *B60W 2554/4049* (2020.02)

(56) References Cited

U.S. PATENT DOCUMENTS

| | | | |
|---|---|---|---|
| 2007/0111857 A1 | 5/2007 | De Mersseman | |
| 2009/0312933 A1 | 12/2009 | Hoetzer | |
| 2010/0152963 A1 | 6/2010 | Heckel et al. | |
| 2010/0191446 A1 | 7/2010 | Mc Donald et al. | |
| 2011/0071746 A1 | 3/2011 | O'Connor Gibson et al. | |
| 2012/0010797 A1 | 1/2012 | Luo et al. | |
| 2012/0016573 A1* | 1/2012 | Ellis ................ | B60K 31/0008 701/112 |
| 2012/0179357 A1 | 7/2012 | Phillips | |
| 2013/0180500 A1 | 7/2013 | Nishina | |
| 2014/0005906 A1* | 1/2014 | Pandita ............. | B60W 30/17 706/46 |
| 2014/0046581 A1 | 2/2014 | Ota et al. | |
| 2014/0058579 A1 | 2/2014 | Ono | |
| 2014/0257637 A1 | 9/2014 | Sangameswaran et al. | |
| 2014/0303868 A1 | 10/2014 | Otake | |
| 2014/0330479 A1 | 11/2014 | Dolgov et al. | |
| 2014/0358841 A1 | 12/2014 | Ono | |
| 2015/0057905 A1 | 2/2015 | Niwa et al. | |
| 2015/0120160 A1 | 4/2015 | Foltin | |
| 2015/0183433 A1 | 7/2015 | Suzuki | |
| 2015/0204253 A1 | 7/2015 | Yang et al. | |
| 2015/0275840 A1 | 10/2015 | Sawada | |
| 2015/0291171 A1 | 10/2015 | Kuroki et al. | |
| 2015/0314768 A1 | 11/2015 | Wright | |
| 2016/0229402 A1 | 8/2016 | Morita et al. | |
| 2016/0272205 A1* | 9/2016 | Kato ................ | B60T 7/122 |
| 2016/0273468 A1* | 9/2016 | Kato ................ | F02D 41/042 |
| 2016/0304095 A1 | 10/2016 | Fischer | |
| 2017/0001640 A1 | 1/2017 | Asakura et al. | |
| 2017/0106876 A1 | 4/2017 | Gordon et al. | |
| 2017/0226947 A1 | 8/2017 | Kawakami et al. | |
| 2017/0282921 A1 | 10/2017 | Limbacher | |
| 2018/0037226 A1* | 2/2018 | Otake ................ | B60W 10/04 |
| 2018/0178795 A1* | 6/2018 | Takada .............. | F02N 11/0837 |
| 2018/0265089 A1* | 9/2018 | Inaba ................ | F01M 1/02 |
| 2018/0273047 A1 | 9/2018 | Wang | |
| 2019/0017486 A1 | 1/2019 | Kuretake | |
| 2019/0118798 A1 | 4/2019 | Kuretake | |
| 2019/0118812 A1 | 4/2019 | Kuretake | |
| 2020/0079374 A1 | 3/2020 | Duan et al. | |
| 2020/0240342 A1 | 7/2020 | Miyagawa | |

FOREIGN PATENT DOCUMENTS

| | | |
|---|---|---|
| JP | 06-297982 A | 10/1994 |
| JP | 2004-204747 A | 7/2004 |
| JP | 2009-528213 A | 8/2009 |
| JP | 2012-47148 A | 3/2012 |
| JP | 2012-91695 A | 5/2012 |
| JP | 2015-068213 A | 4/2015 |
| JP | 2017-15030 A | 1/2017 |
| WO | WO-03/001055 A1 | 1/2003 |
| WO | WO-2012/161815 A1 | 11/2012 |
| WO | WO 2016/042882 A1 | 3/2016 |

OTHER PUBLICATIONS

USPTO Office Action, U.S. Appl. No. 16/755,928, dated May 10, 2022, 14 pages.

* cited by examiner

CONTROL METHOD AND CONTROL DEVICE FOR AUTONOMOUS VEHICLE

TECHNICAL FIELD

The present invention relates to a control method and a control device for an autonomous vehicle, the control method and the control device automatically stopping an engine while a vehicle is traveling.

BACKGROUND ART

As a technology that automatically stops an engine while a vehicle is traveling, JP2004-204747 discloses a technology that stops fuel supply to an engine when a brake pedal is depressed by a driver although it is related to deceleration timing. Therefore, an unnecessary fuel consumption is suppressed while the vehicle is traveling, and it is thus possible to reduce a fuel consumption.

SUMMARY OF INVENTION

There is a demand that automatic stop control for the engine while a vehicle is traveling is introduced to an autonomous vehicle.

For example, as control for an autonomous vehicle in a case where a preceding vehicle is present in front of an own vehicle, there is control as described below that causes the own vehicle to follow the preceding vehicle. With this control, an intervehicular distance between the own vehicle and the preceding vehicle is detected, and driving force of an engine and braking force are controlled so that the intervehicular distance is a given distance in accordance with vehicle speed of the own vehicle.

However, with the foregoing control, acceleration and deceleration of the own vehicle depend only on a behavior of the preceding vehicle viewed from the own vehicle, in other words, the intervehicular distance between the own vehicle and the preceding vehicle. Therefore, the following problem arises when introduction of the automatic stop control for the engine is considered.

When the preceding vehicle accelerates and decelerates repeatedly, the engine starts and stops repeatedly in order to make adjustments in response to changes in the intervehicular distance. For example, the engine that is stopped due to automatic stop control is restarted in response to an expansion of the intervehicular distance due to acceleration of the preceding vehicle, and then the engine is stopped in accordance with a reduction of the intervehicular distance. Thus, when the engine is started and stopped repeatedly, especially when these operations are repeated in a short period of time, an effect of a reduction of fuel consumption by the automated stop of the engine is largely lessened. In addition, it is concerned that fuel consumption may be worsened due to introduction of the automatic stop control.

An object of the invention is to provide a control method and a control device for an autonomous vehicle in consideration of the above problems.

According to one embodiment of the present invention, a control method for an autonomous vehicle is provided. The control method according to one embodiment is a method of controlling an autonomous vehicle having an engine as a driving source, wherein required driving force is set in accordance with an intervehicular distance between an own vehicle and a preceding vehicle when there is the preceding vehicle in front of the own vehicle, and when there is the preceding vehicle, a behavior of the preceding vehicle is predicted from a situation in front of the preceding vehicle. When there is the preceding vehicle, sailing stop is executed based on the required driving force and the predicted behavior of the preceding vehicle, the sailing stop causing the engine to stop automatically while the own vehicle is traveling at vehicle speed equal to or higher than given vehicle speed.

The control method according to another embodiment is a method of controlling an autonomous vehicle having an engine as a driving source, wherein required driving force is set in accordance with an intervehicular distance between an own vehicle and a preceding vehicle when there is the preceding vehicle in front of the own vehicle, and when there is the preceding vehicle, a traveling state of another vehicle relative to the own vehicle is detected, the another vehicle excluding the preceding vehicle and traveling in a lane in the same direction. When there is the preceding vehicle, sailing stop is executed based on the required driving force and the traveling state of the another vehicle relative to the own vehicle, the sailing stop causing the engine to stop automatically while the own vehicle is traveling at vehicle speed equal to or higher than given vehicle speed.

According to yet another embodiment of the present invention, a control device for an autonomous vehicle is provided.

DESCRIPTION OF EMBODIMENTS

Hereinafter, an embodiment of the invention is described with reference to the drawings.

(Entire Configuration)

Figure 1:
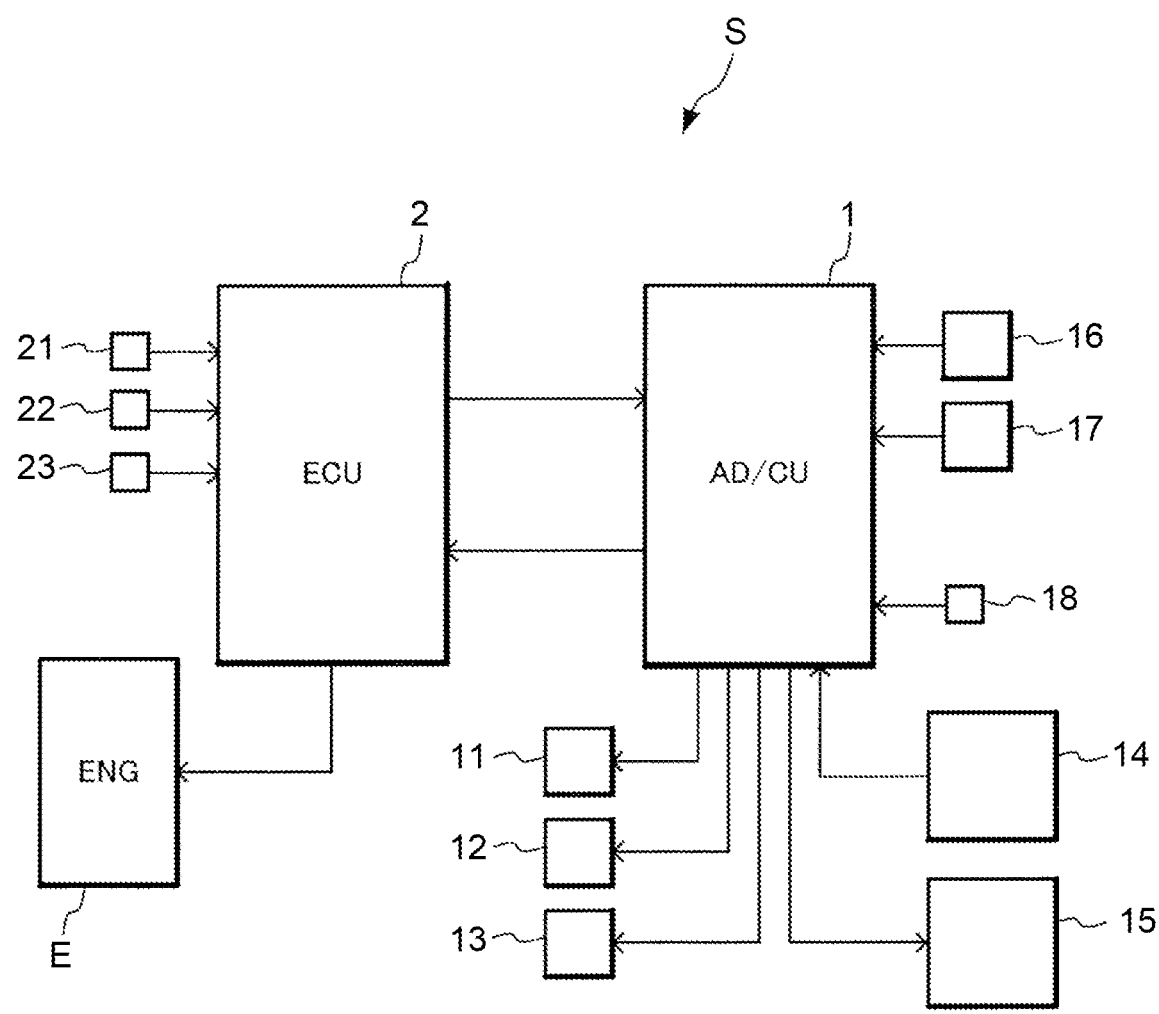
FIG. 1 is a schematic view of an entire configuration of a control device for an autonomous vehicle according to an embodiment of the invention.

FIG. 1 is a schematic view of an entire configuration of a control device (hereinafter, referred to as a "vehicle control system") S for an autonomous vehicle according to the embodiment of the invention.

The vehicle control system S includes an internal combustion engine (hereinafter, simply referred to as an "engine") E serving as a driving source of a vehicle, an advanced driver assistance system control unit (ADAS/CU) 1, and an engine controller (ECU) 2. The engine controller 2 controls operations of the engine E, and controls an output of the engine E by adjusting an intake air quantity, an amount of fuel supply, and so on to the engine E. The engine controller 2 is connected to the advanced driver assistance system control unit 1 so that they are able to communicate with each other. As information regarding the engine control, a signal from an accelerator sensor 21 that detects an operation amount of an accelerator pedal by a driver, a signal from a revolution speed sensor 22 that detects revolution speed of the engine E, a signal from a water-temperature sensor 23 that detects temperature of coolant for the engine E, and so on are input to the engine controller 2.

The advanced driver assistance system control unit 1 sets various control parameters regarding autonomous driving of the vehicle, and outputs command signals to various equipment (for example, the engine E) related to the autonomous driving. In this embodiment, the "autonomous driving" means a driving state in which all operations of acceleration, braking, and steering are done on a system side in a state where the vehicle is able to return to driver's manual driving anytime by choice of the driver under the surveillance by the driver. However, a category of automation and a level of the autonomous driving to which this embodiment is applicable are not limited to this.

As devices related to the autonomous driving of a vehicle, the vehicle control system S includes an automated steering device 11, an automated wheel brake device 12, and automated parking brake device 13, in addition to the engine E. Any of the automated steering device 11, the automated wheel brake device 12, and the automated parking brake device 13 can be operated in accordance with a command signal from the advanced driver assistance system control unit 1. The automated steering device 11 is a device that changes a traveling direction of the vehicle during the autonomous driving. The automated wheel brake device 12 is a device that generates braking force in the vehicle without an operation of a brake pedal by a driver. The automated parking brake device 13 is a device that operates a parking brake automatically when a system start switch of the vehicle is turned off.

Further, the vehicle control system S includes a switching device 14, and a display device 15. The switching device 14 is used to switch between the autonomous driving and the manual driving by choice of the driver, and to set traveling conditions at the time of the autonomous driving. The display device 15 causes the driver to recognize an operation state of the autonomous driving and a traveling state of the vehicle. In this embodiment, the switching device 14 includes an operation part. The operation part is configured as an intensive switch (hereinafter, referred to as a "handle switch") provided adjacent to a grip part of a steering wheel, and is used to switch on and off the autonomous driving, change set vehicle speed and a set intervehicular distance, and start the vehicle by the autonomous driving from temporary stop of the vehicle. The display device (hereinafter, referred to as a "meter display") 15 is installed in a dashboard for a driver's seat. The display device 15 is configured so as to make the on and off states of the autonomous driving visually recognized (for example, different display colors are used for the on and off states of the autonomous driving, respectively), and includes a display part that displays the set vehicle speed and a set intervehicular distance.

In this embodiment, each of the advanced driver assistance system control unit 1 and the engine controller 2 is configured as an electronic control unit including a central processing unit (CPU), various storage devices such as ROM and RAM, and a microcomputer including an input-output interface and so on.

The advanced driver assistance system control unit 1 receives an input of a signal from the handle switch 14, as well as a signal from a preceding vehicle detecting unit 16, and a signal from an intervehicular distance measuring device 17 as information regarding the autonomous driving. The preceding vehicle detecting unit 16 detects presence of a preceding vehicle in a range of a given distance in front of the own vehicle, and may be, for example, an optical camera sensor. The intervehicular distance measuring device 17 detects the intervehicular distance between the own vehicle and the preceding vehicle, and also detects an intervehicular distance between the own vehicle and another vehicle traveling in front of the preceding vehicle (hereinafter, referred to as a "pre-preceding vehicle"). The intervehicular distance measuring device 17 may be a radar sensor such as a millimeter wave radar sensor. Based on a signal from the intervehicular distance measuring device 17, to be specific, based on a change amount of the intervehicular distance per unit time, the advanced driver assistance system control unit 1 detects relative speed of the preceding vehicle or the pre-preceding vehicle to the own vehicle. Here, presence of the pre-preceding vehicle, the intervehicular distance between the own vehicle and the pre-preceding vehicle, and the relative speed of the pre-preceding vehicle with respect to the own vehicle are examples of a "situation in front of the preceding vehicle". The control based on the intervehicular distance and the relative speed of the pre-preceding vehicle is already implemented in some types of vehicles by the applicant of this application with a name of a "predictive forward collision warning (PFCW)".

In addition to above, the advanced driver assistance system control unit 1 also receives an input of a signal from a vehicle speed sensor 18 that detects vehicle speed VSP. A signal that indicates the vehicle speed VSP can also be input to the advanced driver assistance system control unit 1 through the engine controller 2.

Once the autonomous driving is selected due to the operation of the handle switch 14, the vehicle control system S sets required acceleration or required driving force for the vehicle in accordance with the traveling state of the own vehicle, a traveling state of a vehicle other than the own vehicle (for example, the preceding vehicle), surrounding traffic situation, and so on. The advanced driver assistance system control unit 1 sets the required driving force, and outputs a command signal to the engine controller 2 so as to cause the engine E to generate output torque in accordance with the required driving force. The autonomous driving is canceled as the driver operates the handle switch 14 or performs some kind of operation related to a behavior of the vehicle (for example, depression of the brake pedal).

In addition to the above-mentioned control at normal time, the vehicle control system S also executes sailing stop control by which fuel supply to the engine E is stopped during cruise traveling of the vehicle, and the engine E is stopped automatically. Specifically, when cruise traveling at vehicle speed equal to or higher than sailing stop permission speed VSP1 (for example, 40 km/hour) continues for a given period of time, the sailing stop control is executed. During the sailing stop control, the engine E is stopped, and also a clutch is released. The clutch is interposed on a power route that connects the engine E to drive wheels of the vehicle. Thus, power transmission between the engine E and the drive wheels can be blocked. Further, when the vehicle is traveling while following the preceding vehicle, the vehicle control system S executes control of permitting or prohibiting execution of the sailing stop that automatically stops the engine E that is operating, and permitting or prohibiting restart of the engine E that is automatically stopped by the sailing stop, depending on a situation in front of the preceding vehicle (in this embodiment, a traveling state of the pre-preceding vehicle relative to the own vehicle).

Figure 2:
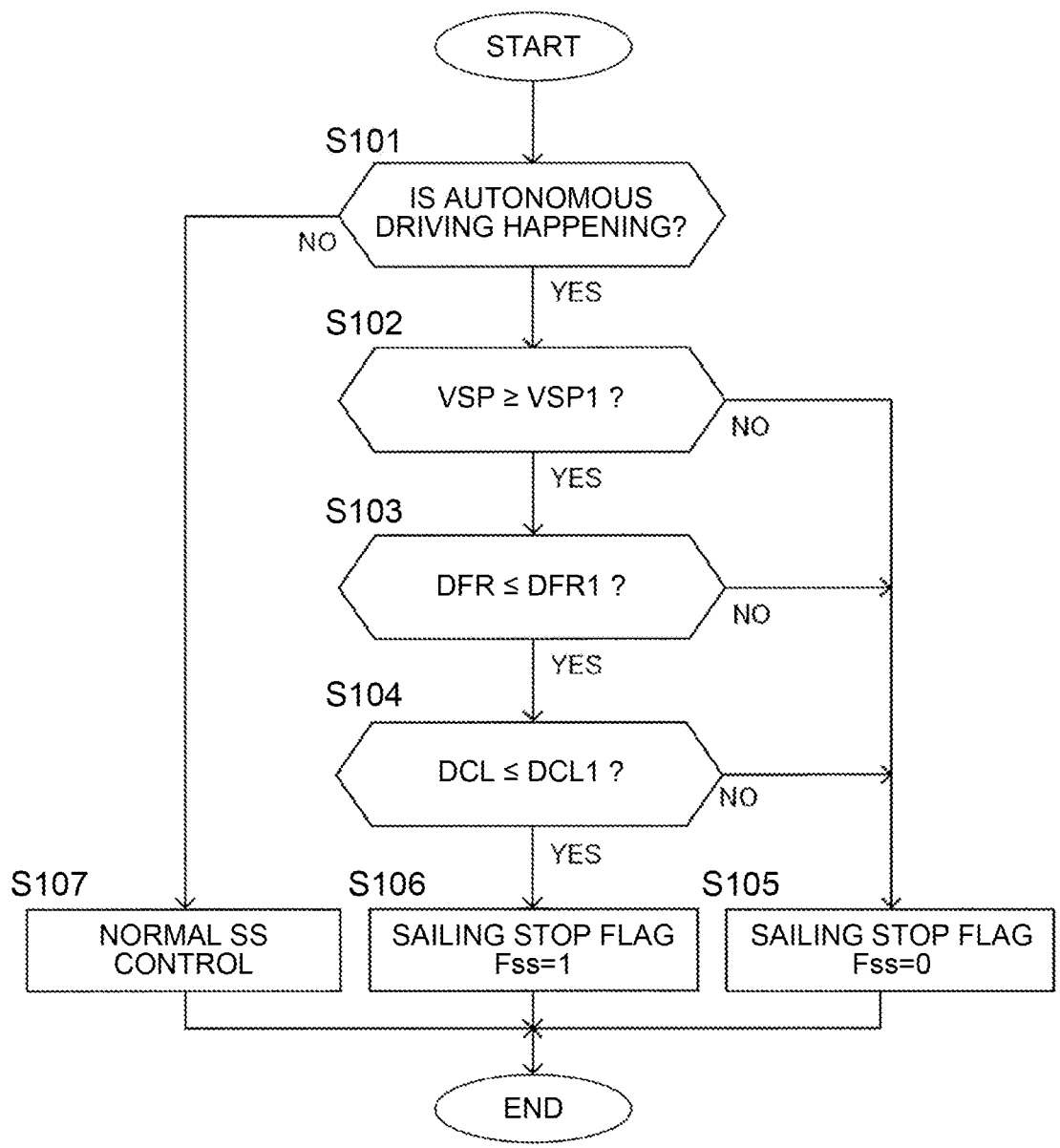
FIG. 2 is a flowchart showing a basic flow of sailing stop control according to the embodiment.
Figure 3:
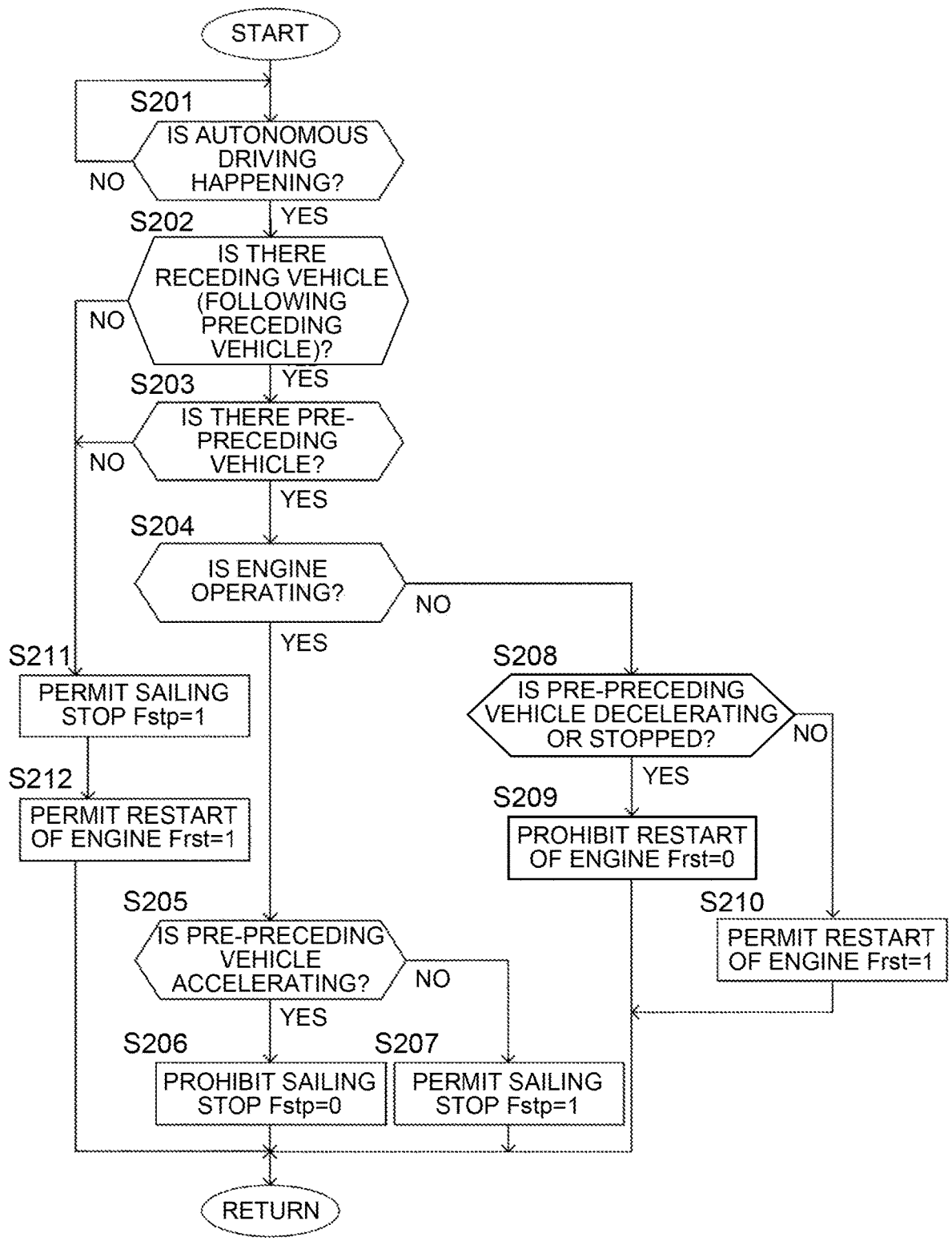
FIG. 3 is a flowchart describing processing for determining cancellation permission for execution of sailing stop in the sailing stop control according to the embodiment.
Figure 4:
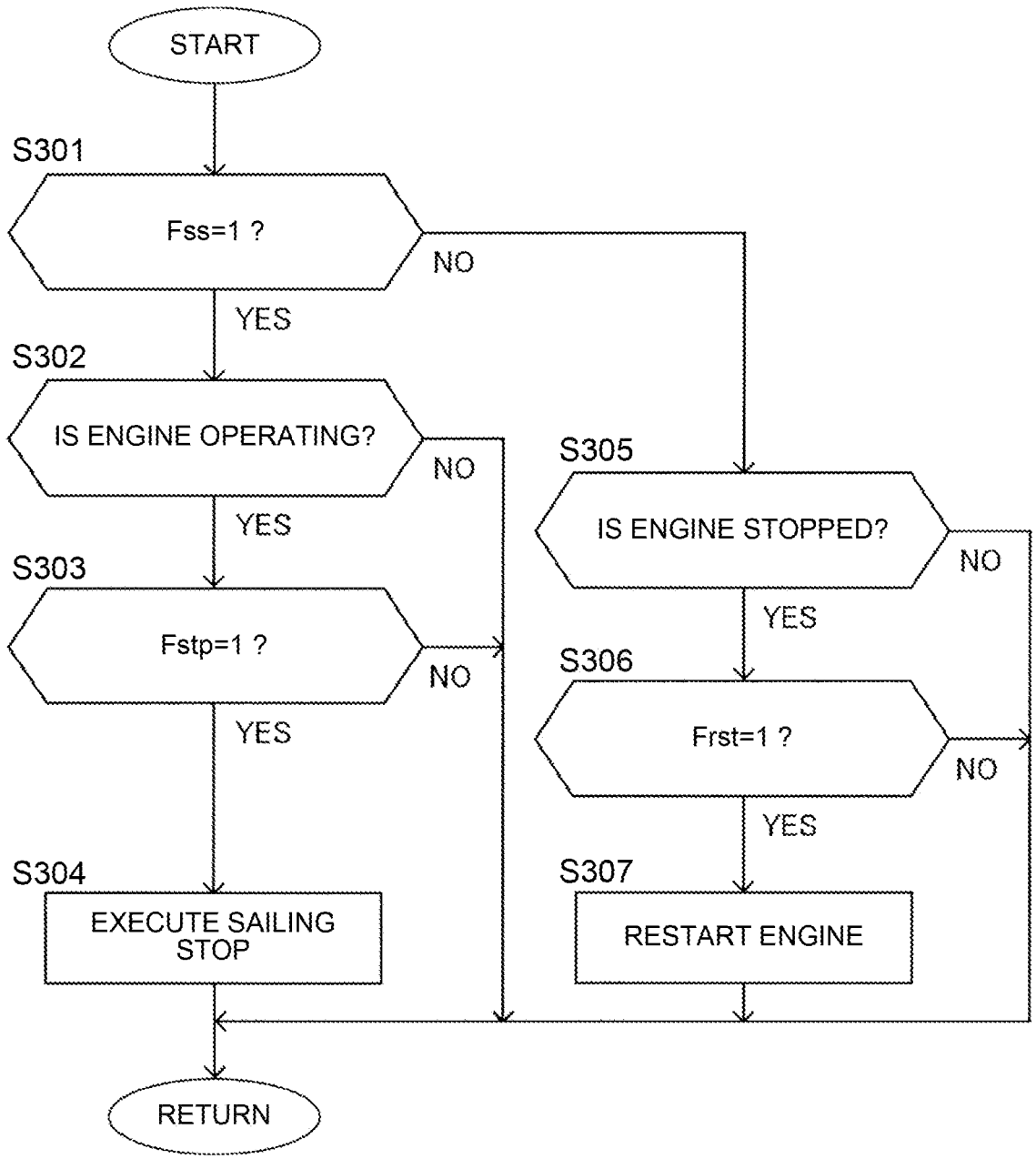
FIG. 4 is a flowchart describing processing for cancellation of execution of the sailing stop in the sailing stop control according to the embodiment.

FIG. 2 to FIG. 4 are flowcharts describing control executed by the advanced driver assistance system control unit 1 with respect to the sailing stop control. FIG. 2 shows a basic flow of the sailing stop control according to this embodiment, and FIG. 3 and FIG. 4 describe processing executed at the time of following traveling (processing for determining cancellation permission for execution of the sailing stop, processing for cancellation of execution of sailing stop) as a part of the sailing stop control. The advanced driver assistance system control unit 1 is programmed so as to execute the control or the processing at every given time. The execution cycles of the control shown in FIG. 2 to FIG. 4 may be the same as or different from each other.

In the flowchart shown in FIG. 2, in S101, it is determined whether or not the autonomous driving is being performed. It is possible to determine whether or not the autonomous driving is being performed based on a signal from the handle switch 14. When it is determined that the autonomous driving is being performed, the control moves on to S102, and when it is determined that the autonomous driving is not being performed, the control moves on to S107.

In S102, it is determined whether or not the vehicle speed (hereinafter, simple "vehicle speed" means vehicle speed of the own vehicle) VSP is equal to or higher than sailing stop permission speed VSP1 (for example, 40 km/hour). When the vehicle speed VSP is equal to or higher than the sailing stop permission speed VSP1, the control moves on to S103, and, when the vehicle speed VSP is lower than the sailing stop permission speed VSP1, the control moves on to S105.

In S103, it is determined whether or not required driving force DFR of the vehicle is equal to or smaller than a given value DFR1. The given value DFR1 is set to a value that indicates that the vehicle is in cruise traveling, and, it is 0 (zero) in this embodiment. This means that, in S103, it can also be said that it is determined whether or not there is an acceleration request for the vehicle from the system side. At the time of following traveling, the advanced driver assistance system control unit 1 detects vehicle speed VSP of the own vehicle, the relative speed RVS of the preceding vehicle to the own vehicle, and the intervehicular distance D between the own vehicle and the preceding vehicle based on signals from the camera sensor 16 and the radar sensor 17, and controls driving force and braking force of the vehicle so that the intervehicular distance D becomes a given distance Dset corresponding to the vehicle speed VSP while setting set vehicle speed Vset or vehicle speed limit (for example, 100 km/hour) as an upper limit.

In S104, it is determined whether or not a deceleration DCL of the vehicle is equal to or lower than a given value DCL1. When the deceleration DCL is equal to or lower than the given value DCL1, the control moves on to S106. Meanwhile, when the deceleration DCL is higher than the given value DCL1, the control moves on to S105 in order to avoid execution of the sailing stop with excessively high deceleration.

In S105, a sailing stop flag Fss is set to 0.
In S106, the sailing stop flag Fss is set to 1.
In S107, the sailing stop control for normal driving (in other words, manual driving) is executed. Specifically, fuel supply to the engine E is stopped when the vehicle speed VSP while neither an accelerator pedal nor a brake pedal is depressed by a driver is equal to or higher than the sailing stop permission speed VSP1, thereby stopping the engine E. Then, when the vehicle is decelerated so as to be slower than the sailing stop permission speed VSP1 or the accelerator pedal is depressed, fuel supply to the engine E is restarted, thereby restarting the engine E.

Moving on to description of the flowchart shown in FIG. 3 (the processing for determining cancellation permission for execution of the sailing stop), in S201, it is determined whether or not the vehicle is in autonomous driving. When the vehicle is in the autonomous driving, the control moves on to S202, and, when the vehicle is not in the autonomous driving, the processing of S201 is executed repeatedly.

In S202, it is determined whether or not there is a preceding vehicle, in other words, whether or not the vehicle is in the following traveling. Specifically, based on a signal from the camera sensor 16, it is determined whether or not there is a preceding vehicle traveling in the same lane within a range of a given distance in front of the own vehicle. When there is a preceding vehicle, the control moves on to S203, and, when there is no preceding vehicle, the control moves on to S211.

In S203, it is determined whether or not there is a pre-preceding vehicle as a situation in front of the preceding vehicle. The advanced driver assistance system control unit 1 is able to analyze and detect presence of a pre-preceding vehicle based on a signal from the radar sensor 17. When there is a pre-preceding vehicle, the control moves on to S204, and when there is no pre-preceding vehicle, the control moves on to S211.

In S204, it is determined whether or not the engine E is operating. When the engine E is operating, the control moves on to S205, and, when the engine E is not operating (in other words, when the engine E is automatically stopped due to the sailing stop), then the control moves on to S208.

In S205, it is determined whether or not the pre-preceding vehicle is accelerating relative to the own vehicle. When the pre-preceding vehicle is accelerating, the control moves on to S206, and when the pre-preceding vehicle is decelerating or stopped (in other words, the pre-preceding vehicle is traveling at the same speed as the own vehicle), the control moves on to S207. Here, when the pre-preceding vehicle is accelerating relative to the own vehicle, it is possible to predict acceleration of the preceding vehicle.

In S206, a sailing stop permission flag Fstp is set to 0, prohibiting execution of the sailing stop for the engine E that is operating.

In S207, the sailing stop permission flag Fstp is set to 1, permitting execution of the sailing stop for the engine E that is operating.

In S208, it is determined whether or not the pre-preceding vehicle is decelerating or stopped relative to the own vehicle. When the pre-preceding vehicle is decelerating or stopped, the control moves on to S209, and when the pre-preceding vehicle is accelerating, the control moves on to S210. Here, when the pre-preceding vehicle is decelerating or stopped relative to the own vehicle, it is possible to predict deceleration of the preceding vehicle.

In S209, an engine restart permission flag Frst is set to 0 so that cancellation of the sailing stop for the engine E that is automatically stopped by the sailing stop is prohibited. In other words, restart of the engine E is prohibited.

In S210, the engine restart permission flag Frst is set to 1 so that restart of the engine E that is automatically stopped by the sailing stop is permitted.

In S211, the sailing stop permission flag Fstp is set to 1 so that execution of the sailing stop is permitted.

In S212, the engine restart permission flag Frst is set to 1 so that restart of the engine E that is automatically stopped by the sailing stop is permitted.

Moving on to description of the flowchart shown in FIG. 4 (processing for cancellation of execution of the sailing stop), in S301, it is determined whether or not the sailing stop flag Fss is 1, in other words, it is determined whether or not a given condition regarding execution of the sailing stop is satisfied. When the sailing stop flag Fss is 1, the control moves on to S302, and when the sailing stop flag Fss is not 1, the control moves on to S305.

In S302, it is determined whether or not the engine E is operating. When the engine E is operating, the control moves on to S303, and, when the engine E is not operating, the control by this routine is ended, and the sailing stop is continued, and the engine E is kept stopped.

In S303, it is determined whether or not the sailing stop permission flag Fstp is 1. When the sailing stop permission flag Fstp is 1, the control moves on to S304, and when the sailing stop permission flag Fstp is not 1, it is considered that execution of the sailing stop is prohibited, and the control by this routine is ended as it is in order to keep the engine E operating.

In S304, the sailing stop is executed, and the engine E is stopped.

In S305, it is determined whether or not the engine E is stopped. When the engine E is stopped, the control moves on to S306, and, when the engine E is not stopped, the control by this routine is ended, and the engine E is kept stopped.

In S306, it is determined whether or not the engine restart permission flag Frst is 1. When the engine restart permission flag Frst is 1, the control moves on to S307, and, when the engine restart permission flag Frst is not 1, it is considered that restart of the engine E is prohibited, and the control by this routine is ended as it is in order to continue the sailing stop.

In S307, the sailing stop is cancelled, and fuel supply to the engine E is restarted so that the engine E is restarted.

Figure 5:
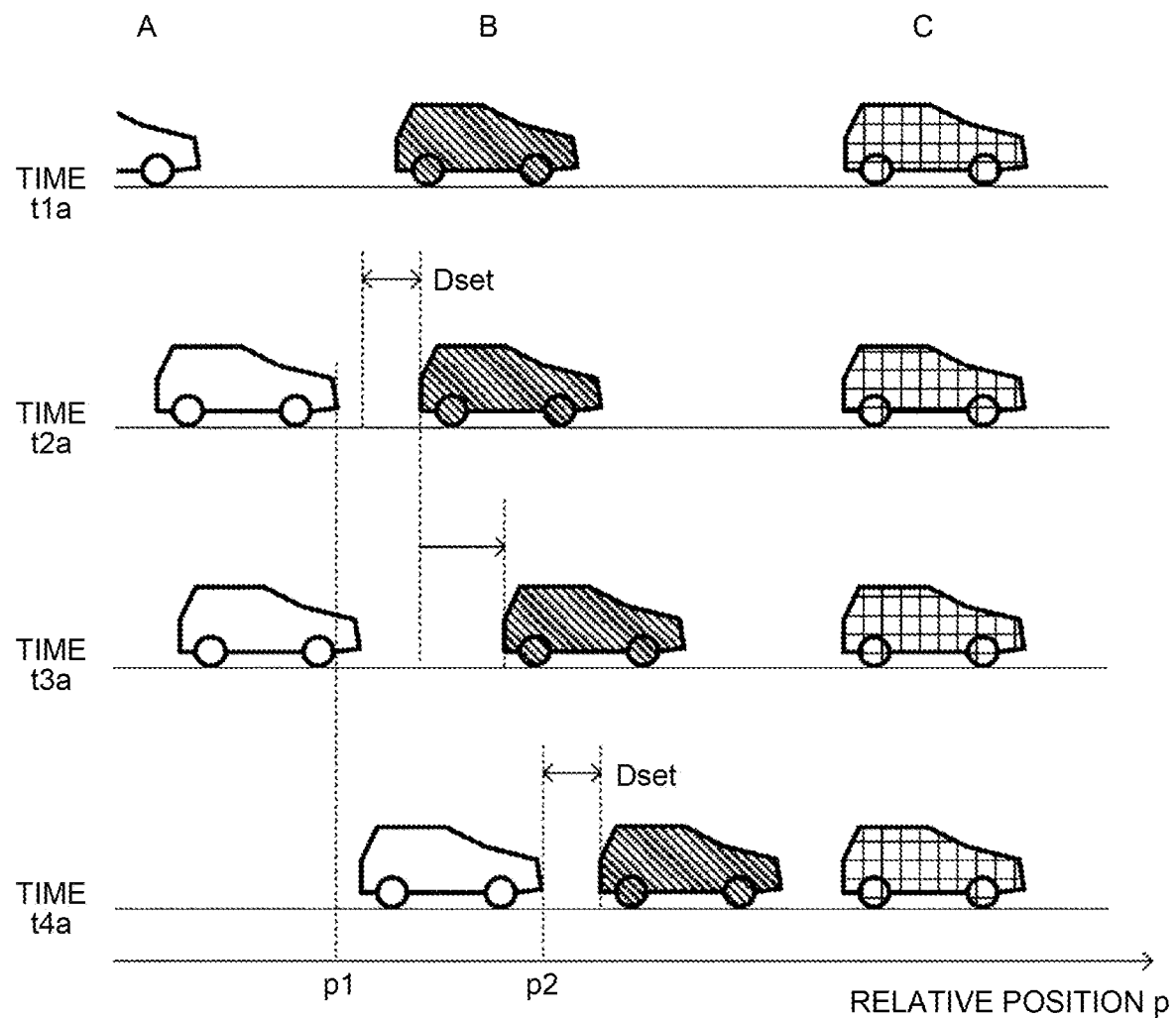
FIG. 5 is a view describing an example of behaviors of an own vehicle and a preceding vehicle when a pre-preceding vehicle is decelerating relative to the own vehicle.
Figure 6:
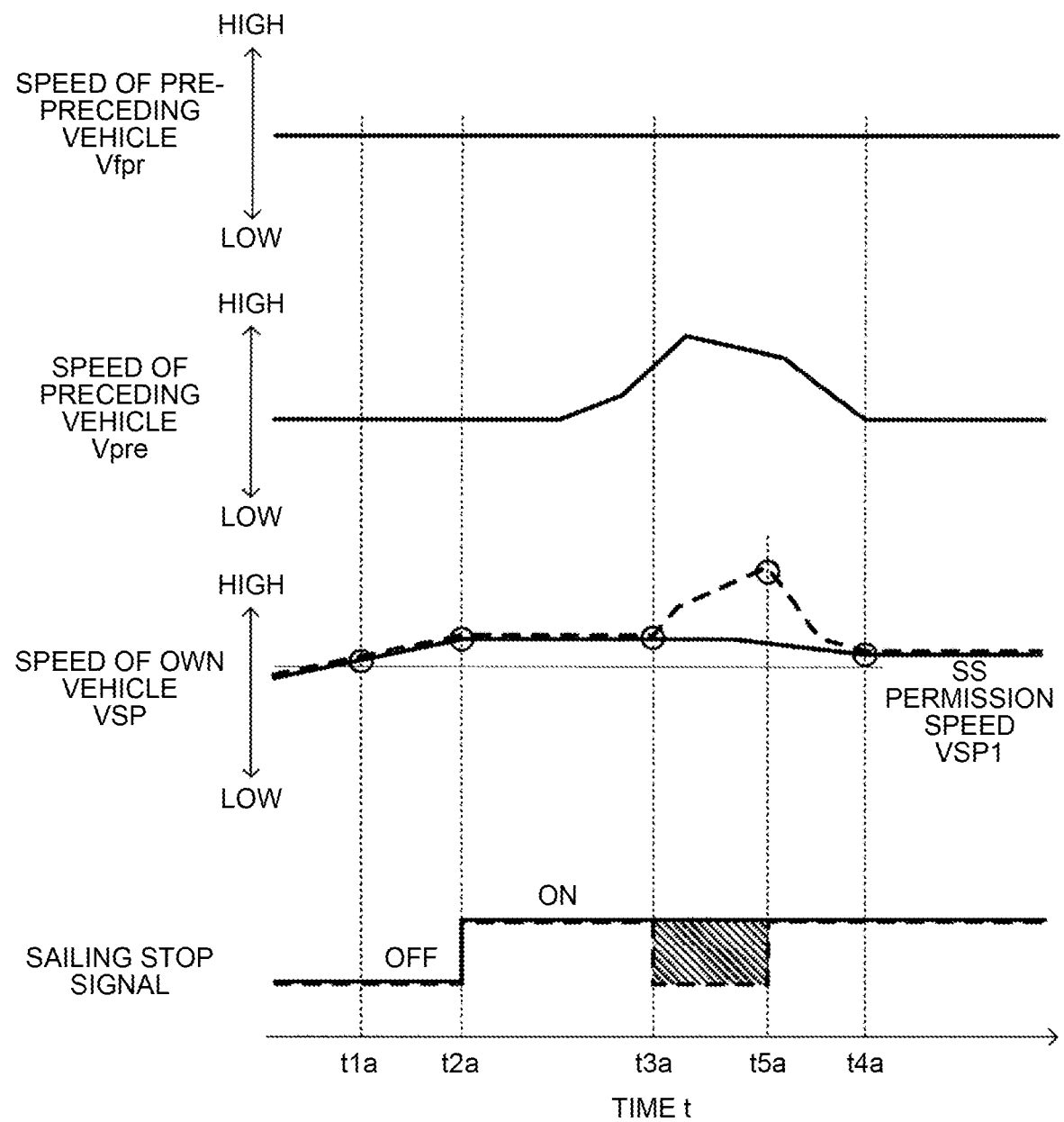
FIG. 6 is a view describing effects in the example shown in FIG. 5.

FIG. 5 is a view describing an example of behaviors of an own vehicle A and a preceding vehicle B when a pre-preceding vehicle C is decelerating relative to the own vehicle A. FIG. 6 is a view describing effects in the example shown in FIG. 5. With reference to FIG. 6 as necessary, operations of the vehicle control system S according to this embodiment are described based on FIG. 5. The horizontal axis in FIG. 5 shows a mutual positional relation (relative positions p) of the own vehicle A, the preceding vehicle B, and the pre-preceding vehicle C for convenience of the description, and does not show actual positions. This is the same for FIG. 7.

The pre-preceding vehicle C travels at constant speed in front of the own vehicle A and the preceding vehicle B in the same lane, and the own vehicle A and the preceding vehicle B are getting closer to the pre-preceding vehicle C while the own vehicle A is accelerating and the preceding vehicle B is maintaining constant speed (time t1a). Here, this situation satisfies the condition that the vehicle speed VSP is equal to or higher than the sailing stop permission speed VSP1. However, since the acceleration is happening, the required driving force DFR exceeds the given value DFR1. Therefore, the sailing stop flag Fss is set to 0 (S105), and the engine E is operating.

When the own vehicle A gets closer to the preceding vehicle B, and the required driving force DFR is reduced to a value equal to or smaller than the given value DFR1 in order to adjust the intervehicular distance D, the sailing stop flag Fss is switched from 0 to 1 (S106) on condition that the deceleration DCL is not excessively high. Since the pre-preceding vehicle C is decelerating relative to the own vehicle A, the sailing stop permission flag Fstp is set to 1 (S207) with regard to the engine E that is operating. Due to this, the sailing stop is executed (S304), and fuel supply to the engine E is stopped (time t2a).

After execution of the sailing stop, as the preceding vehicle B accelerates (time t3a), the required driving force DFR exceeds the given value DFR1 due to expansion of the intervehicular distance D, and the sailing stop flag Fss is switched from 1 to 0 (S105).

Here, in this embodiment, since the pre-preceding vehicle C is decelerating relative to the own vehicle A, the engine restart permission flag Frst is set to 0 (S209) for the engine E that is automatically stopped by the sailing stop, and restart of the engine E is prohibited. Therefore, the sailing stop continues.

Thereafter, the own vehicle A gets closer to the preceding vehicle B in a state where the own vehicle A is gently decelerating while the engine E is kept stopped so that a relative position p2 is maintained (time t4a). At the relative position p2, there is a given intervehicular distance Dset from the preceding vehicle B that follows the pre-preceding vehicle C.

In FIG. 6, a solid line represents a sailing stop signal in the case of this embodiment, and a broken line represents a sailing stop signal in a case of a comparative example in which processing for determining cancellation permission for execution of the sailing stop is not executed.

In the comparative example, when the intervehicular distance D expands due to acceleration of the preceding vehicle B after the time t2a, and the required driving force DFR increases and exceeds the given value DFR1 (time t3a), then the sailing stop flag Fss is switched from 1 to 0. As a result, the sailing stop signal is turned into an off state, and fuel supply to the engine E is restarted, and the engine E is restarted. Thereafter, as the intervehicular distance D is reduced due to deceleration of the preceding vehicle B, the required driving force DFR is reduced, and, once the required driving force DFR reaches the given value DFR1, the sailing stop flag Fss is set to 1 again (time t5a), and the sailing stop signal is turned into an on state, and the engine E is stopped.

On the other hand, in this embodiment, the engine restart permission flag Frst is set to 0 due to the processing for determining cancellation permission for execution of the sailing stop even in a period in which the sailing stop signal is turned off in the case of the comparative example (time t3a to time t5a). Thus, the cancellation of the sailing stop is prohibited, and the sailing stop signal is kept in the on state.

Figure 7:
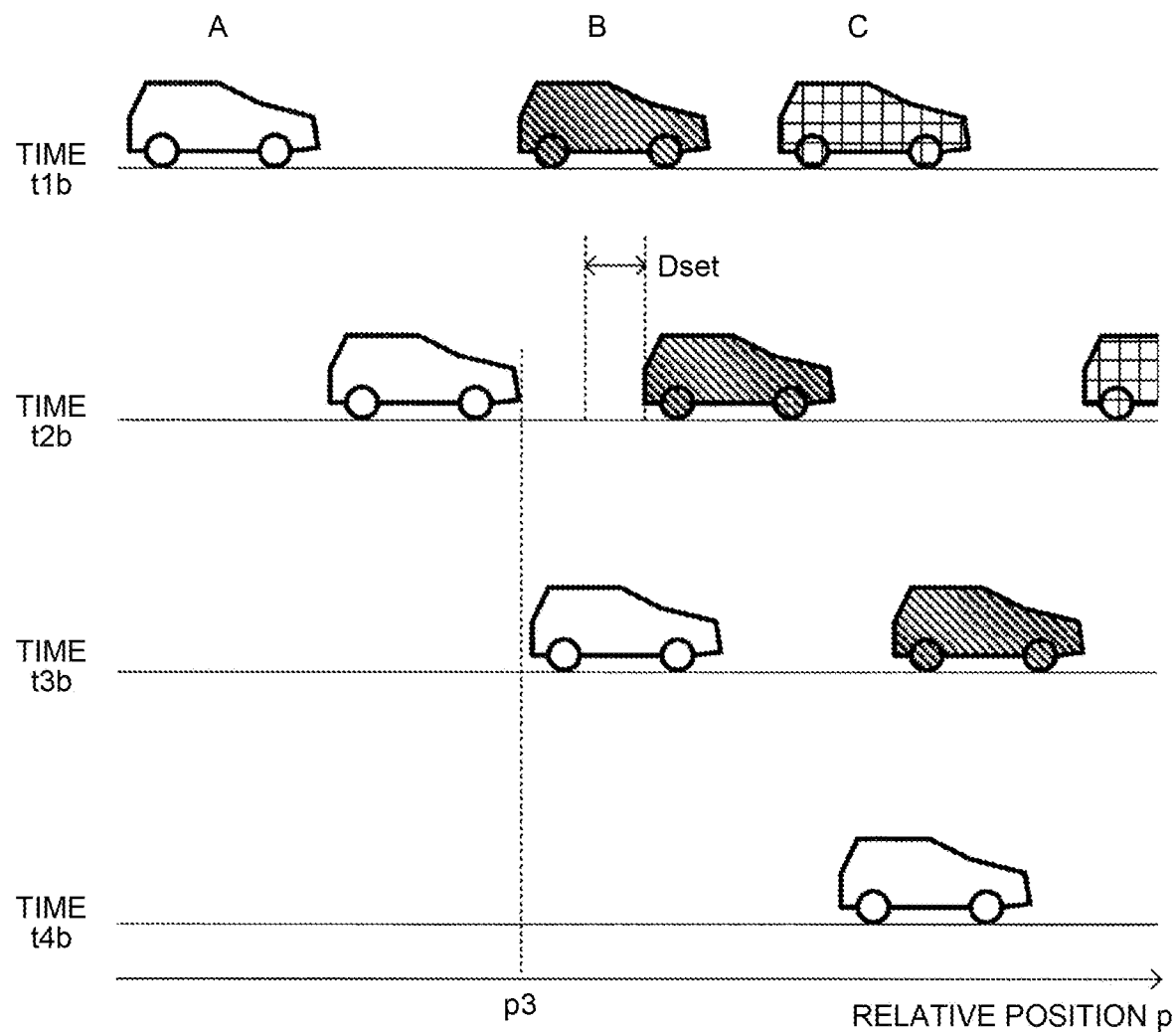
FIG. 7 is a view describing an example of behaviors of the own vehicle and the preceding vehicle when the pre-preceding vehicle is accelerating relative to the own vehicle.
Figure 8:
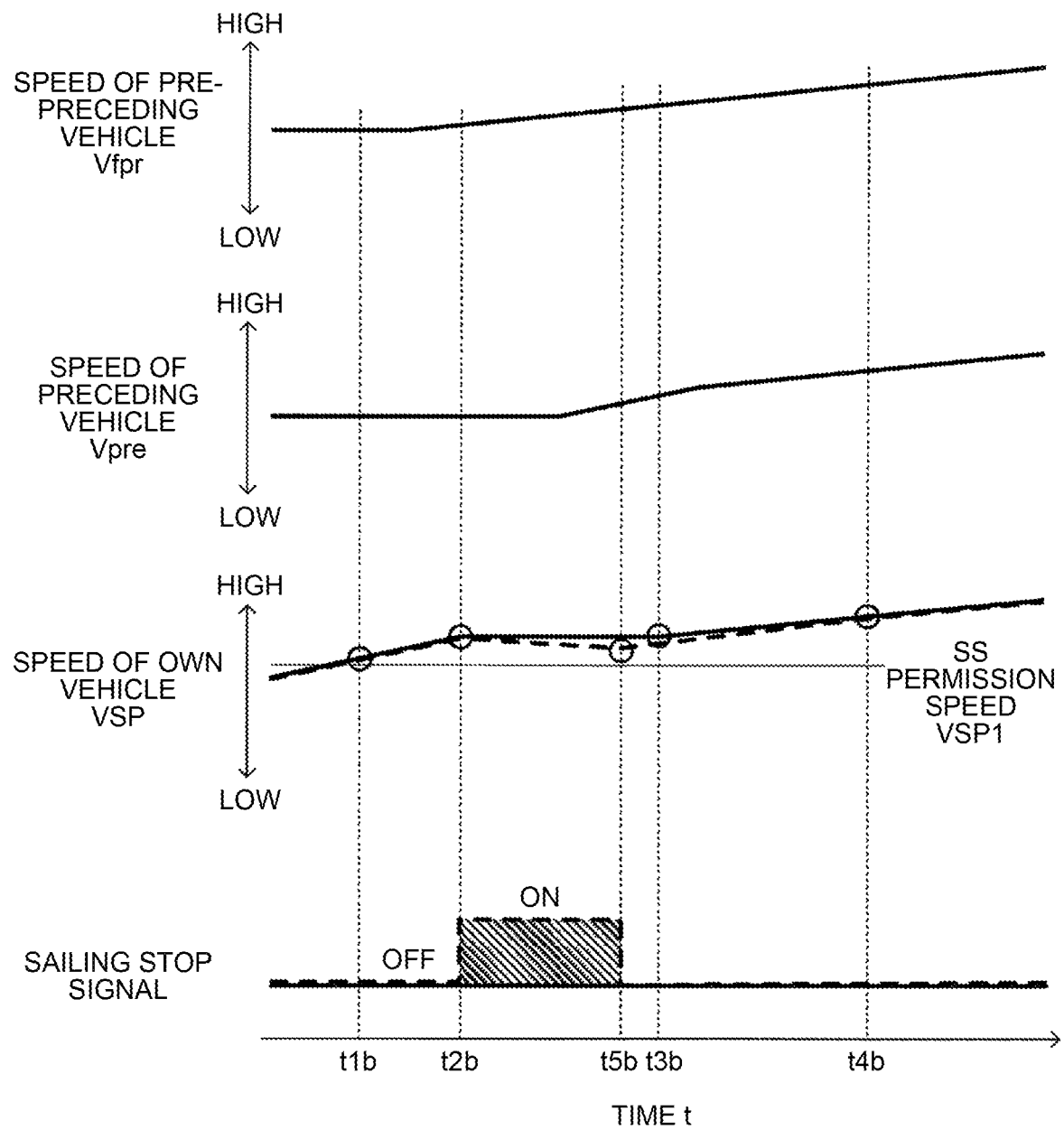
FIG. 8 is a view describing effects in the example shown in FIG. 7.

FIG. 7 is a view describing an example of behaviors of the own vehicle A and the preceding vehicle B when the pre-preceding vehicle C is accelerating relative to the own vehicle A, and FIG. 8 is a view describing effects in the example shown in FIG. 7. With reference to FIG. 8 as necessary, operations of the vehicle control system S according to this embodiment are described further based on FIG. 7.

The own vehicle A is getting closer to the preceding vehicle B and the pre-preceding vehicle C while the own vehicle A is accelerating, the preceding vehicle B and the pre-preceding vehicle C traveling at constant speed in the same lane (time t1b). Similarly to the example shown in FIG. 5, although this state satisfies the condition that the vehicle speed VSP is equal to or higher than the sailing stop permission speed VSP1, the sailing stop flag Fss is set to 0 (S105) as the acceleration is happening. Thus, the engine E is operating.

When the own vehicle A gets closer to the preceding vehicle B, and the required driving force DFR is reduced in accordance with a reduction of the intervehicular distance D and reaches the given value DFR1, then the sailing stop flag Fss is switched from 0 to 1 (S106). Here, the pre-preceding vehicle C has already started accelerating before the required driving force DFR reaches the given value DFR1, and, at time t2b when the required driving force DFR reaches the given value DFR1, the pre-preceding vehicle C is accelerating relative to the own vehicle A. Because of this, the sailing stop permission flag Fstp is set to 0 for the engine E that is operating (S206), and execution of the sailing stop is prohibited. Thus, fuel supply to the engine E is continued, and the engine E is maintained in an idling state (time t2b).

Thereafter, as the preceding vehicle B accelerates (time t3b), the required driving force DFR exceeds the given value DFR1 due to expansion of the intervehicular distance D, and the sailing stop flag Fss is switched from 1 to 0 (S105).

Then, the own vehicle A accelerates following the preceding vehicle B, and maintains an intervehicular distance D (=Dset) from the preceding vehicle B in accordance with the vehicle speed VSP (time t4b).

In FIG. 8, a solid line represents a sailing stop signal in the case of this embodiment, and a broken line represents a sailing stop signal in the case of a comparative example.

In the comparative example, when the required driving force DFR is reduced to the given value DFR1 as the own vehicle A is getting closer to the preceding vehicle B (time t2b), the sailing stop flag Fss is switched from 0 to 1. As a result, the sailing stop signal is turned to the on state, the sailing stop is executed, and fuel supply to the engine E is stopped. Thereafter, when the intervehicular distance D expands due to acceleration of the preceding vehicle B, the required driving force DFR increases in order for the own vehicle A to follow the preceding vehicle B. As the required driving force DFR exceeds the given value DFR1, the sailing stop flag Fss is set to 0 again (time t5b), the sailing stop signal is tuned to the off state, and the engine E is restarted.

On the other hand, in this embodiment, the sailing stop permission flag Fstp is set to 0 due to the processing for determining cancellation permission for execution of the sailing stop even in a period in which the sailing stop signal is turned to the on state in the case of the comparative example (time t2b to time t5a). Thus, execution of the sailing stop is prohibited, and the sailing stop signal is kept in the off state.

In this embodiment, a "control device for the autonomous vehicle" includes the engine E, the advanced driver assistance system control unit 1, the engine controller 2, the preceding vehicle detecting unit 16, and the intervehicular distance measuring device 17, an "engine" includes the engine E, and a "controller" includes the advanced driver assistance system control unit 1 and the engine controller 2.

Among the processing executed by the advanced driver assistance system control unit 1, the processing of S103 in the flowchart shown in FIG. 2 functions as a "required driving force setting part", the processing in S203, S205, and S208 in the flowchart shown in FIG. 3 functions as a "preceding vehicle behavior predicting part", and the processing of S102 to S106 in the flowchart shown in FIG. 2, the processing of S206, S207, S209, S210 in the flowchart shown in FIG. 3, and the entire processing of the flowchart shown in FIG. 4 functions as a "sailing stop executing part".

(Description of Actions and Effects)

The control device (the vehicle control system S) for the autonomous vehicle according to this embodiment is configured as described so far, and effects obtained from this embodiment are summarized as follows.

In this embodiment, the sailing stop is executed for an autonomous vehicle during cruise traveling in which driving force is not necessary. Thus, unnecessary fuel consumption by the engine E is suppressed, and it is thus possible to reduce fuel consumption.

Here, when there is the preceding vehicle B in front of the own vehicle A, a behavior of the preceding vehicle B is predicted based on a situation in front of the preceding vehicle B. Then, when future deceleration of the preceding vehicle B is predicted in response to expansion of the intervehicular distance D (not only due to acceleration of the preceding vehicle B but also due to deceleration of the own vehicle A) (for example, the pre-preceding vehicle C is decelerating relative to the own vehicle A), restart of the engine E that is automatically stopped by the sailing stop is prohibited, and the sailing stop is thus continued. Because of this, it is possible to avoid unnecessary restart and stop of the engine E in accordance with acceleration of the preceding vehicle B and deceleration of the preceding vehicle B thereafter, thereby suppressing a deterioration of fuel consumption.

Here, not only in a case where the pre-preceding vehicle C is decelerating relative to the own vehicle A, but also in a case where the pre-preceding vehicle C is traveling at the same speed as the own vehicle A (in other words, stopped relative to the own vehicle A), deceleration of the preceding vehicle B may be predicted, restart of the engine E may be prohibited, and the sailing stop may be continued.

On the other hand, when future acceleration of the preceding vehicle B is predicted in response to a reduction of the intervehicular distance D (for example, due to deceleration of the preceding vehicle B) (for example, in a case where the pre-preceding vehicle C is accelerating relative to the own vehicle A), execution of the sailing stop for the engine E that is operating is prohibited, and the engine E is kept operating (for example, idling is continued). Because of this, it is possible to avoid unnecessary stop and restart of the engine E in accordance with deceleration of the preceding vehicle B and acceleration of the preceding vehicle B thereafter, thereby restraining deterioration of fuel consumption.

Since unnecessary start or restart of the engine E is avoided as described above, loads on engine elements used for start of the engine E (for example, electrical components such as a fuel pump, a starter motor, and a battery) are reduced, and deterioration of the engine elements is suppressed.

In the foregoing description, the traveling state of the pre-preceding vehicle C relative to the own vehicle A is used as a situation in front of the preceding vehicle B. However, the invention is not limited to this. It is also possible to use a road situation, a traffic situation, or the like in front of the preceding vehicle such as the preceding vehicle B entering a curved road, presence of a tollbooth in front of the preceding vehicle B, and the preceding vehicle B reaching an end of a tailback, and it is possible to predict acceleration or deceleration of the preceding vehicle B based on these situations. For example, when the preceding vehicle B enters a curved road, it is possible to predict deceleration of the preceding vehicle B. When there is a tollbooth in front of the preceding vehicle B or the preceding vehicle B reaches an end of a tailback, it is possible to predict deceleration or stoppage of the preceding vehicle B. It is possible to grasp entry into a curved road and presence of a tollbooth through a navigation device, and it is possible to grasp that the preceding vehicle B reaches an end of a tailback with use of road traffic information (for example, VICS (registered trademark) information) and so on.

Further, permission to execution and cancellation of coast stop may be determined based on not only a situation in front of the preceding vehicle B but also a behavior of a vehicle other than the preceding vehicle (hereinafter, referred to as "another vehicle") traveling in a lane in the same direction.

Specifically, when there is another vehicle traveling in front of the own vehicle A in a lane in the same direction as the lane in which the own vehicle A and the preceding vehicle B are traveling (a lane except the same lane, such as a passing lane for the traveling lane), a traveling state of the another vehicle relative to the own vehicle A is detected. Then, when the another vehicle is decelerating or stopped relative to the own vehicle A, the sailing stop is executed in response to a reduction of the intervehicular distance D from the preceding vehicle B (regardless of the situation in front of the preceding vehicle B). This means that, in a situation in which the own vehicle A is prohibited from passing the preceding vehicle B, execution of the sailing stop in accordance with the intervehicular distance D is permitted. On the other hand, when the another vehicle is accelerating relative to the own vehicle A, cancellation of the coast stop is permitted and the engine E is restarted in response to expansion of the intervehicular distance D from the preceding vehicle B even when future deceleration of the preceding vehicle B is predicted from the situation in front of the preceding vehicle B. When the preceding vehicle B decelerates, the own vehicle A is able to change the lanes. Therefore, it is possible to avoid stoppage of the engine E after the engine E is restarted. The processing for detecting another vehicle and determining a traveling state relative to the own vehicle A configures a function of an "another vehicle traveling state detecting part".

Moreover, regardless of another vehicle present in front of the own vehicle A, execution of the sailing stop in accordance with the intervehicular distance D may be permitted when another vehicle approaching the own vehicle A from behind is detected and a traveling area necessary for passing is not ensured in an adjacent lane.

The "lane in the same direction" may be a lane adjacent to either the right or left side of the lane in which the own vehicle A is traveling. This lane is not limited to a passing lane on the right side of the traveling lane, and may be a first traveling lane on the left side of the traveling lane of the own vehicle A when the own vehicle A is traveling in the second lane.

The traveling states of the preceding vehicle B and the pre-preceding vehicle C relative to the own vehicle A can be detected not only by a sensor (the radar sensor 17) but also by communication among the vehicles.

The embodiment of the invention has been described so far. However, the above embodiment only shows a part of application examples of the invention, and is not intended to limit the technical range of the invention to the specific configuration of the embodiment. Various changes and modifications can be made in the above embodiment without departing from the scope of the claims.

The invention claimed is:

1. A control method for an autonomous vehicle provided with an engine as a driving source, comprising:
   setting a required driving force in accordance with an intervehicular distance between an own vehicle and a preceding vehicle when there is the preceding vehicle in front of the own vehicle;
   predicting a behavior of the preceding vehicle from a situation in front of the preceding vehicle when there is the preceding vehicle;
   executing a sailing stop based on the required driving force and the predicted behavior of the preceding vehicle, the sailing stop causing the engine to stop automatically while the own vehicle is traveling at vehicle speed equal to or higher than a given vehicle speed;
   when future deceleration of the preceding vehicle is predicted as the behavior of the preceding vehicle in response to expansion of the intervehicular distance, prohibiting a cancellation of the sailing stop for the engine that is automatically stopped; and
   prohibiting an execution of the sailing stop for the engine that is operating when future acceleration of the preceding vehicle is predicted as a behavior of the preceding vehicle in response to a reduction of the intervehicular distance.

2. The control method for the autonomous vehicle according to claim 1, further comprising:
   detecting a traveling state of a pre-preceding vehicle traveling in front of the preceding vehicle, the traveling state being relative to the own vehicle as a situation in front of the preceding vehicle; and
   prohibiting a cancellation of the sailing stop when the pre-preceding vehicle is decelerating or stopped relative to the own vehicle.

3. The control method for the autonomous vehicle according to claim 1, further comprising:
   detecting a traveling state of a pre-preceding vehicle traveling in front of the preceding vehicle, the traveling state being relative to the own vehicle, as a situation in front of the preceding vehicle; and
   prohibiting an execution of the sailing stop when the pre-preceding vehicle is accelerating relative to the own vehicle.

4. A control method for an automated vehicle provided with an engine as a driving source, comprising:
   setting a required driving force in accordance with an intervehicular distance between an own vehicle and a preceding vehicle when there is the preceding vehicle in front of the own vehicle;
   detecting a traveling state of another vehicle relative to the own vehicle when there is the preceding vehicle, the another vehicle excluding the preceding vehicle and traveling in a same direction as the own vehicle in a lane other than a lane in which the own vehicle is traveling;
   executing a sailing stop based on the required driving force and the traveling state of the another vehicle relative to the own vehicle when there is the preceding vehicle, the sailing stop causing the engine to stop automatically while the own vehicle is traveling at a vehicle speed equal to or higher than a given vehicle speed;
   when the another vehicle is decelerating or stopped relative to the own vehicle, executing the sailing stop in response to a reduction of the intervehicular distance from the preceding vehicle regardless of a situation in front of the preceding vehicle, and
   when the another vehicle is accelerating relative to the own vehicle, permitting cancellation of the sailing stop and restarting the engine in response to expansion of the intervehicular distance from the preceding vehicle even when future deceleration of the preceding vehicle is predicted from the situation in front of the preceding vehicle.

5. A control device for an autonomous vehicle, comprising:
   an engine serving as a driving source of a vehicle; and
   a controller configured to control an operation of the engine, wherein
   the controller includes:
      a required driving force setting part configured to set required driving force in accordance with an intervehicular distance between an own vehicle and a preceding vehicle when there is the preceding vehicle in front of the own vehicle;
      a preceding vehicle behavior predicting part configured to predict a behavior of the preceding vehicle from a situation in front of the preceding vehicle when there is the preceding vehicle; and
      a sailing stop executing part configured to execute a sailing stop when there is the preceding vehicle, based on the required driving force and the predicted behavior of the preceding vehicle, the sailing stop causing the engine to stop automatically while the own vehicle is traveling at a vehicle speed equal to or higher than a given vehicle speed, and the sailing stop executing part configured to prohibit a cancellation of the sailing stop for the engine that is automatically stopped when future deceleration of the preceding vehicle is predicted as the behavior of the preceding vehicle in response to expansion of the intervehicular distance,
   wherein the controller is configured to prohibit an execution of the sailing stop for the engine that is operating when future acceleration of the preceding vehicle is predicted as a behavior of the preceding vehicle in response to a reduction of the intervehicular distance.

6. A control device for an automated vehicle, comprising:
   an engine serving as a driving source of a vehicle; and
   a controller configured to control an operation of the engine, wherein
   the controller includes:
      a required driving force setting part configured to set a required driving force in accordance with an intervehicular distance between an own vehicle and a preceding vehicle when there is the preceding vehicle in front of the own vehicle;
      an another vehicle traveling state detecting part configured to, when there is the preceding vehicle, detect a traveling state of another vehicle relative to the own vehicle, the another vehicle excluding the preceding vehicle and traveling in a same direction as the own vehicle in a lane other than a lane in which the own vehicle is traveling; and
      a sailing stop executing part configured to execute a sailing stop when there is the preceding vehicle, based on the required driving force and the travelling state of the another vehicle relative to the own vehicle, the sailing stop causing the engine to stop automatically while the own vehicle is traveling at equal to or higher than a given vehicle speed,
   wherein the controller is configured to, when the another vehicle is decelerating or stopped relative to the own vehicle, execute the sailing stop in response to a reduction of the intervehicular distance from the preceding vehicle regardless of a situation in front of the preceding vehicle,
   wherein the controller is configured to, when the another vehicle is accelerating relative to the own vehicle, permit cancellation of the sailing stop and restart the engine in response to expansion of the intervehicular distance from the preceding vehicle even when future deceleration of the preceding vehicle is predicted from the situation in front of the preceding vehicle.

* * * * *